Jan. 1, 1957 B. W. KEESE 2,776,019
VEHICLE DRIVE AXLES
Filed Nov. 13, 1952 3 Sheets-Sheet 1
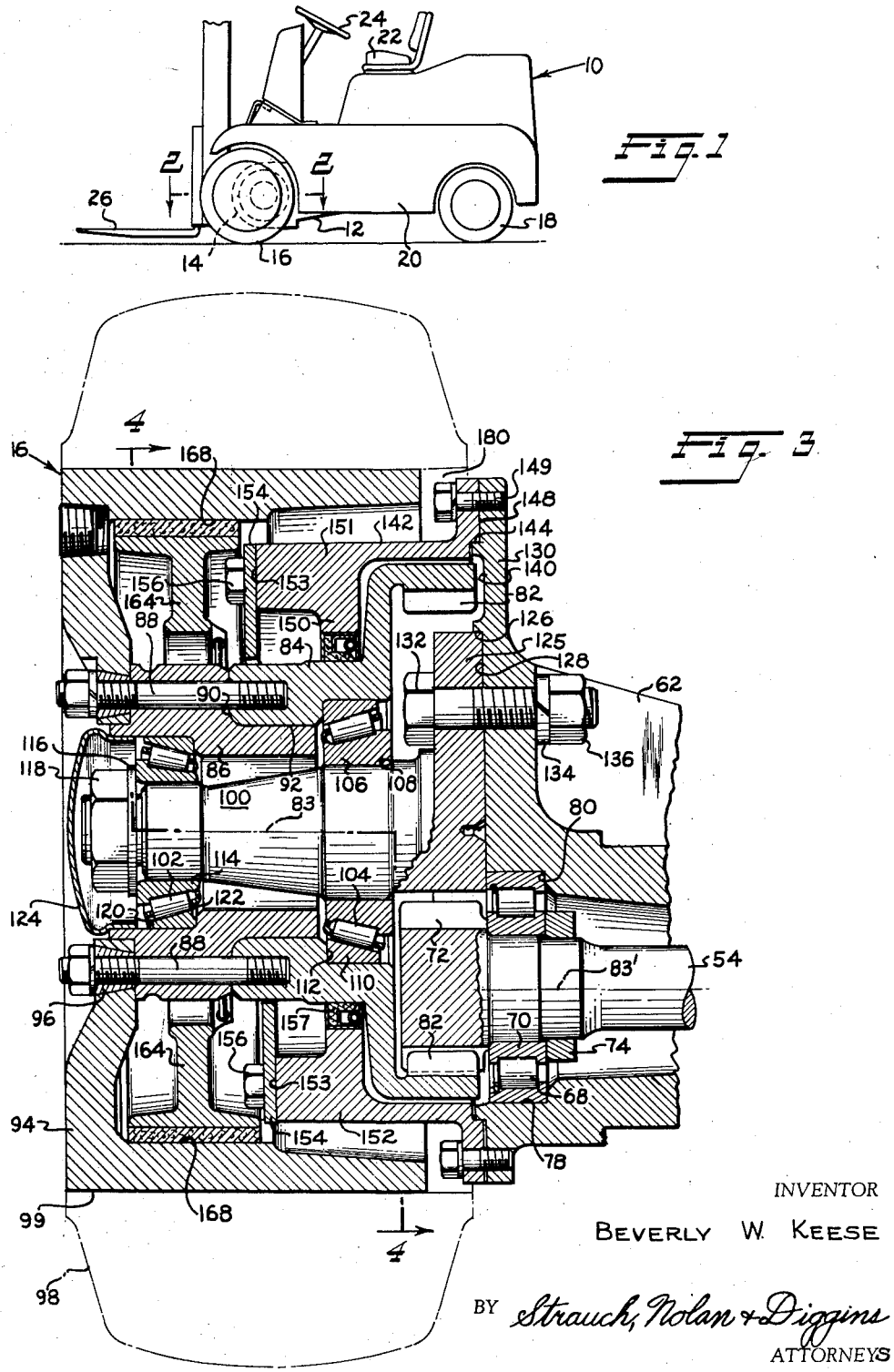
INVENTOR
BEVERLY W. KEESE
BY Strauch, Nolan & Diggins
ATTORNEYS

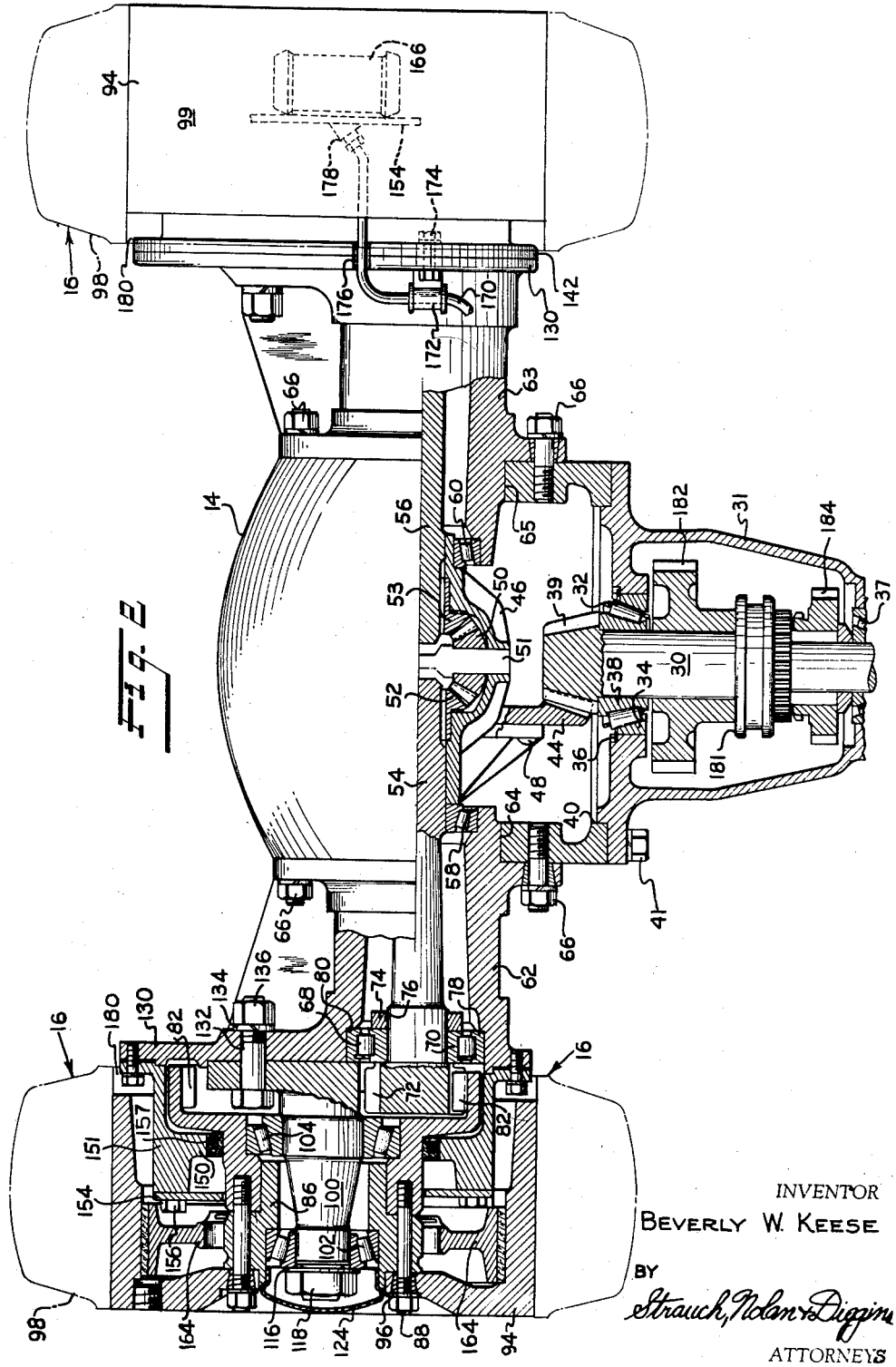

000# United States Patent Office 2,776,019
Patented Jan. 1, 1957

2,776,019

VEHICLE DRIVE AXLES

Beverly W. Keese, Oshkosh, Wis., assignor, by mesne assignments, to Rockwell Spring and Axle Company, Coraopolis, Pa., a corporation of Pennsylvania Application November 13, 1952, Serial No. 320,277

5 Claims. (Cl. 180—75)

This invention relates to improvements in drive axles and mechanisms and has particular references to the driving mechanism and axle for vehicles, such as trucks, which are adapted at their forward end to engage, lift, lower, or otherwise manipulate a load, commonly known as lift trucks.

Due to the necessity of providing a truck of minimum overall dimensions to permit its usage in the confined spaces of a factory, warehouse, etc., the spacing for axles and transmissions on shop vehicles of this type is extremely limited. It is desirable to have the pivot point of front wheel contact with the floor as far forward on the vehicle and as close to the center of gravity of the load as possible to reduce to a minimum the tendency of the vehicle to pivot forwardly about the front wheels under the influence of heavy loads. This can be accomplished by using small diameter wheels positioned as far forward on the truck as possible without interfering with the lift or load carrying portion of the truck and by arranging the vehicle components so that the center of gravity of the vehicle is low and well to the rear of the front drive wheels.

With the foregoing considerations in mind, it is the primary object of the present invention to provide a front axle drive mechanism for lift type shop trucks which is of such construction that the axis of rotation of the front wheels of such a truck can be located further forward on the truck relative to the load carrying mechanism than has heretofore been possible.

Another important object of the present invention is to provide a new and improved front axle drive mechanism for lift type shop trucks which is extremely compact, permitting the use of small diameter front wheels and providing the necessary speed reduction between the engine driven shaft and the driving wheels in a minimum of space.

In furtherance of the aforementioned objects it is a more specific object of the present invention to provide an improved extremely compact wheel and brake mechanism for front axle drive mechanisms of such trucks and improved components of such mechanism which permits the use of small diameter tires and in which an annular member externally forms a tire mounting rim and internally forms a brake drum for coaction with an expandable brake mechanism.

A further specific object of the present invention resides in the provision of an improved front axle drive mechanism and front wheel mounting arrangement for such trucks in which each of the front drive wheels is drive connected to a differential mechanism which is disposed on the truck rearwardly of the front wheel axis to permit location of the load lifting mechanism more closely to the front wheel axis and resulting in the shifting the truck center of gravity rearwardly as compared to prior art mechanisms for this purpose.

More specifically it is an object of the present invention to provide an improved front axle drive mechanism and front wheel mounting arrangement for such trucks in which each of the front drive wheels is connected to a coaxial internal annular gear disposed substantially within the radial profile of the associated wheel, and in which such gears are driven from a differential mechanism disposed rearwardly of the axis of wheel rotation by a gear eccentrically disposed within and constantly meshed with such internal gears to provide a compact differentially driven speed reduction mechanism utilizing a minimum of vehicle space and providing a low rearward center of gravity for the truck.

Another object of the present invention is, by attaching the wheel spindle to the end housing in a counterbore, to keep the overhang to a minimum between the axle spindle load and the axle housing end.

Another object is to have the gear reductions at the outer end of the axle inboard of the brakes for simple lubrication for the gear reductions and the wheel hub support bearings common with the differential and transmission lubrication system.

A further object of the present invention is the provision of a new and improved arrangement of the brake cylinder, brake anchor and the hydraulic tubing for such a vehicle so that a good reliable safe hydraulic brake system is attained in the least possible space, thus conforming to the spacial limitations imposed in this type of vehicle.

These and other objects of the present invention will become more fully apparent by reference to the appended claims and as the following detailed description proceeds in reference to the accompanying drawings wherein:

Figure 1 is a side elevation view of an industrial lift truck embodying the principles of the present invention;

Figure 2 is a view partially in section along the line 2—2 of Figure 1 and partially in elevation of a front drive axle and wheel drive assembly embodying the present invention and including a showing of the axle input from the transmission, the axle detail, the gear reduction within the wheels, and the brake arrangement;

Figure 3 is a sectional view of the wheel drive mechanism being an enlarged view of the left end of Figure 2.

Figure 4:
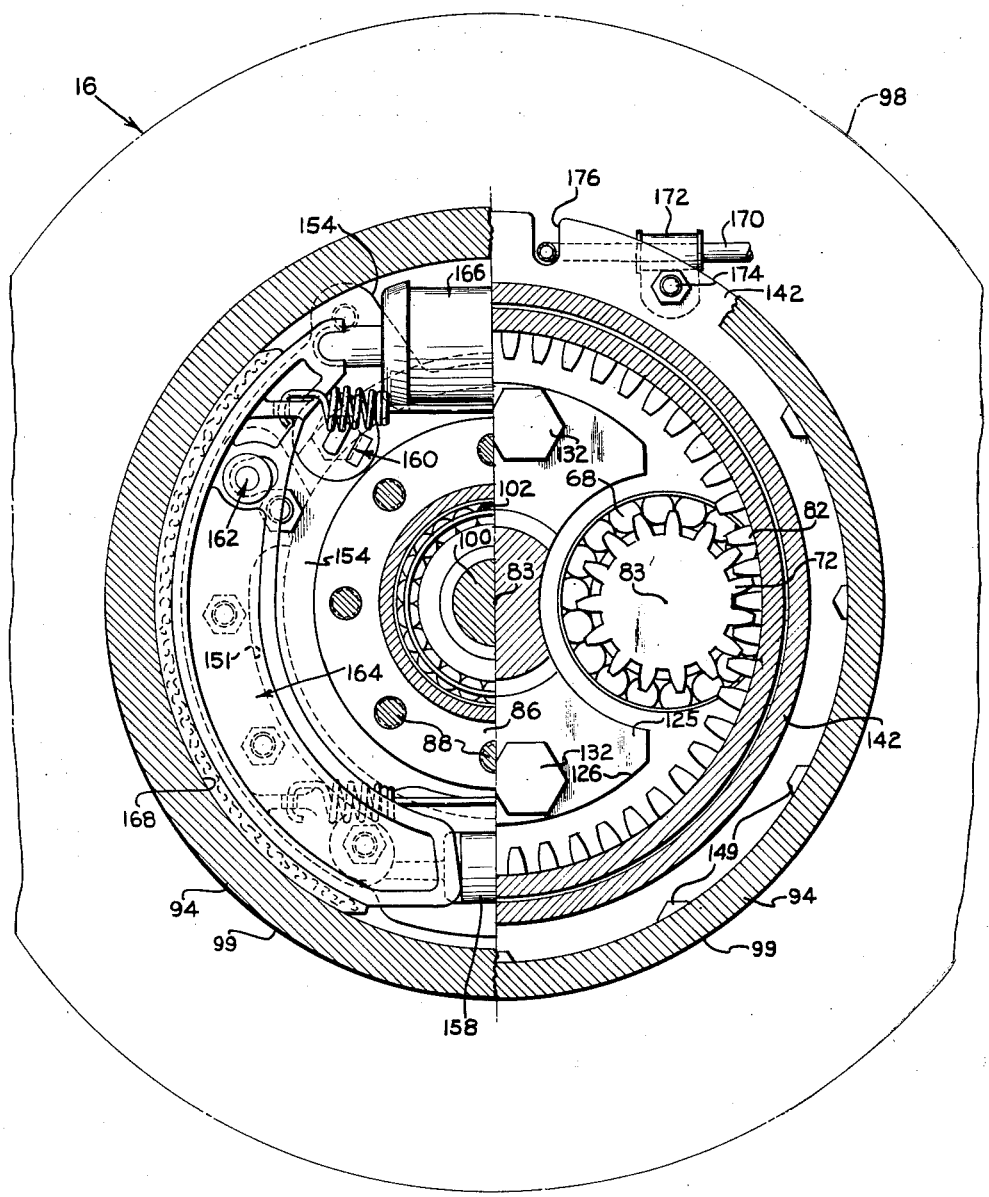
Figure 4 is a sectional view taken along the line 4—4 of Figure 3 illustrating the brake mechanism and axle outer end drive mechanism of the present invention.

Referring now to the drawings and more particularly to Figure 1, the illustrated shop lift truck 10 is shown to have a transmission and transfer housing 12, a differential housing 14, front driving wheels 16, rear dirigible wheels 18, a body 20, a seat 22, a steering wheel 24, a lift fork 26 and includes an engine, a clutch, and transmission and transfer gearing, etc., not shown.

Referring to Figure 2, the transmission and transfer gearing output shaft 30 is journalled within a carrier 31 at its forward or output end by an anti-friction bearing 32, which is preferably of the roller thrust bearing type of which the outer race 34 is retained in position on carrier 31 by a snap ring 36, and is journalled at its opposite or rearward end by an anti-friction bearing 37. The inner race 38 of bearing 32 abuts an output pinion 39 which is preferably formed integral with shaft 30. The carrier 31 is piloted within the rearwardly facing opening 40 of the differential housing 14 and is secured thereto by bolts 41.

Pinion 39 meshes with a differential bevel gear 44 which is fastened to differential cage 46 as by rivets 48. The differential mechanism is conventional in form, comprising differential pinions 50 journalled on a spider 51 and in constant mesh with side gears 52 and 53. Side gears 52 and 53, are respectively splined to left and right axle shafts 54 and 56. Shafts 54 and 56 are therefore supported at their differential ends by the side gears 52 and 53 which are journalled upon the differential cage 46. Cage 46 is in turn journalled by anti-friction bearings 58 and 60 which are preferably opposed roller thrust bearings the outer races of which are supported by axle housings 62 and 63 respectively. Axle housings 62 and 63 are piloted at 64 and 65 on the differential housing 14 and held in place by studs 66 and dowels (not shown).

Since the corresponding members of the axle and wheels are interchangeable left to right, the description of a part or combination of parts on either side will suffice for both sides.

As is illustrated in connection with axle shaft 54, each axle shaft is supported at its wheel end within the associated axle housing by an anti-friction bearing 68 which is fixed axially relative thereto, its inner race 70 being fixed between an integral axle wheel input pinion 72 and a ring 74 which is a press fit on the surface 76 of the shaft 54. Bearing 68 is restrained for inward movement relative to axle housing 62 by the abutment of its outer race 78 against a shoulder 80 on the axle shaft housing 62.

As is best shown in Figures 3 and 4, pinion 72 constantly meshes with an internal annular gear 82, the axis of rotation of which is located at 83 longitudinally forward of and parallel to the common axis of rotation 83' of axle shafts 54 and 56 and pinions 72. The integral hub 84 of gear 82 is coaxially fixed, in assembly, to a wheel hub extension 86 as by guide studs 88, the mating abutment surfaces 90 and cylindrical surfaces 92 holding the two members in proper alignment. A combined wheel mounting and brake drum member 94 is fixed in assembly coaxial with hub extension 86 and ring gear 82 by the guide studs 88 and held in alignment by the doweled effect of the shanks of studs 88 and cylindrical tightening wedges 96 which are also used with studs 66 as shown. A solid rubber tire 98 is mounted about the outer circumferential surface 99 of wheel mounting and brake drum member 94.

The assembly consisting of internal gear 82, hub extension 86, and the wheel 16 (member 94 and tire 98) is mounted for rotation on a fixed wheel spindle 100 by spaced anti-friction bearings 102 and 104 which are preferably opposed roller thrust bearings. The inner race 106 of bearing 104 is restrained from inward movement by shoulder 108 on the spindle 100 and the outer race 110 restrains ring gear hub 84 from inward movement by abutment with the shoulder 112 thereon. The inner race 114 of bearing 102 is restrained from outward movement by bearing retainer 116 which is adjusted and held in position by spindle nut 118. The outer race 120 of bearing 102 restrains hub extension 86 from outward movement by abutment with shoulder 122 formed thereon. A hub cap 124 is received in a press fit into the outer end of the hub extension 86 to seal the bearing structure.

Wheel spindle 100 is provided at its inward end with an integral flange 125 by which it is fixed in registered alignment in a counterbore 126 against registering surface 128 of wheel mounting flange 130 of axle housing 62 as by bolts 132 with lock washers 134 and nuts 136. The mounting flange 130 of axle housing 62 extends longitudinally forward of the axis of the axle shafts 54 and 56 so that the common axis of the spindles 100 and the wheels 16 will be located longitudinally forward of the axis of the axle shafts 54 and 56. An annular clearance groove 140 for the annular gear 82 is formed in the outer face of the mounting flange 130.

A brake assembly mounting member 142 is suitably registered in axial alignment with the spindle 100 in surrounding relation to the gear 82 by piloting surfaces 144 and 148 and fixed in such position by bolts 149. Member 142 extends outwardly from the housing flange 130 between the wheel drum 94 and the ring gear 82 and, beyond ring gear 82, has an axially inwardly extending end wall 150. A pair of opposed arcuately shaped mounting pads 151 and 152 project outwardly from the member 142 to form a mounting surface 153 for a brake backing plate 154 which is fastened thereto as by bolts 156. The arcuate configuration of mounting pad 151 is shown in Figure 4; mounting pad 152 is similar and disposed on the opposite side of the member 142 relative to the axis of spindle 100. An oil seal 157 is provided between the hub 84 of gear 82 and the inner edge of the end wall 150 of the member 142.

A generally conventional expansible brake assembly, which is mounted on the backing plate 154 for coaction with member 94 as shown in Figures 3 and 4, comprises an anchor abutment 158, a pair of adjustment cam assemblies 160, a pair of guide pin assemblies 162, a pair of brake shoes assemblies 164 and a hydraulic brake actuation cylinder 166. Upon energization of the brake actuation cylinder 166, the brake shoes 164 expand to engage brake drum surface 168 of the wheel drum member 94.

Referring to Figures 2 and 4, the brake actuation hydraulic line 170 which is conventionally coupled to a master cylinder (not shown), extends through a support 172 which is secured to the differential side of the axle housing flange 130 as by bolt nut assembly 174 in place of one of the bolts 149. Closely adjacent support 172 and the top of the axle housing flange 130 aligned slots 176 are formed through both the flange 130 and the brake support member 142. The hydraulic line 170 extends through these aligned slots 176 to the hydraulic actuation cylinder 166 where it terminates in a line connection 178 thereto.

An annular open space 180 is provided between the tire 98 and the flange on member 142 for operational clearance and to permit circulation of air to the brakes for cooling purposes.

Lubricating oil is free to circulate directly from the axle housing 62 through roller bearing 68 to the gears 72 and 82 and the spindle mounted wheel hub supporting bearings 102 and 104. Oil is prevented from outward leakage therefrom by hub cap 124 and oil seal 157. This is a simple wheel reduction gearing and support bearing lubrication common to the differential and transmission lubrication system. It is therefore apparent that by removing nuts 88 the brake mechanism may be serviced and adjusted without disturbing the bearing adjustments or the grease chamber.

In operation driving torque is transferred from output shaft 30 (Figure 2) which is shown as adapted for alternative drive connection by axial adjustment of clutch collar 181 to one of the gears 182 and 184 journalled thereon, through the differential to the driving axles 54 and 56. The output pinions 72 on the wheel end of axles 54 and 56 drive internal annular gears 82 which are fixed in assembly with hub extensions 86, wheel and drum members 94, and tires 98 all of which rotate about the axis of fixed spindles 100 so that a large proportion of the total speed reduction between the engine and the wheels 16 is effected within the profile of wheels themselves. This arrangement, therefore, materially reduces the vehicle space utilized by the vehicle drive train.

When under load, there is little tendency for a truck constructed in accordance with the present invention to tip forward due to the small diameter of wheels 16 and their mounting such that the pivot point is as close to the load lift 26 as possible.

From the foregoing detailed description it is apparent that there is provided, by this invention for vehicles such as lift trucks, a new axle wheel combination. It provides a portion of the engine to wheel reduction within the driving wheels to reduce the space utilized by the drive train, a greater stability in the location of the front drive wheel ground contact point closer to the load lift without interference with the wheels, minimum overhang between the axle spindle load and the axle housing end. It provides an improved and novel arrangement for connecting the brake cylinder, brake anchor and the hydraulic tubing in a good reliable safe brake without being hampered by or making further inroads upon the severe spacial limitations on vehicles of this type and simple lubrication for the axle outer end gear reduction and the wheel support bearings common with the differential and transmission lubrication system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an outer end assembly for a drive axle having a housing with a radial end flange and containing a driven axle shaft; a wheel mounting spindle with a radial flange, said radial flange being rigidly secured directly to said housing flange and said spindle projecting outwardly from said housing flange substantially parallel to said axle shaft; a wheel hub surrounding said spindle; an internal ring gear surrounding said spindle and having an axially outwardly extending hub engaging said wheel hub; a gear on said shaft meshed with said ring gear; a combined integral brake drum and tire mounting member having a substantially radial side flange and an axially inwardly extending periphery providing an internal brake drum surface; a brake mechanism support secured to said housing flange and extending axially outwardly therefrom within said drum in surrounding relation to said ring gear; brake shoes mounted on said support adjacent said brake drum surface and axially outwardly of said ring gear; spaced bearings interposed between the spindle and the wheel hub and between the spindle and the ring gear hub respectively; and common fastener means removably securing together said mounting member flange, wheel hub and gear hub whereby said tire mounting member can be removed to enable servicing and removal of the brake mechanism including said brake shoes.

2. In the assembly defined in claim 1, said gear and wheel hubs being telescoped at adjacent end portions between said bearings.

3. In an outer end assembly for a drive axle having an axle housing containing a driven axle shaft and spaced therefrom and wherein a wheel mounting spindle is secured to the axle housing and projects outwardly substantially parallel to the axle shaft, a wheel hub surrounding said spindle and spaced therefrom and having a closure over the outer end of said spindle, an internal ring gear surrounding said spindle and having an axially outwardly extending hub secured to said wheel hub and spaced from the spindle, a gear on said shaft meshed with said ring gear, a brake drum secured upon said wheel hub, a brake mechanism support rigid with said housing extending axially outwardly in surrounding relation to said ring gear, a lubricant seal between the ring gear hub and said support, and coaxial spaced bearings between the spindle and the wheel hub and between the spindle and the ring gear hub respectively, said housing, support, hubs and closure comprising a chamber enclosing said bearings and gears for common lubrication of said bearings and gears.

4. In an outer end assembly of a drive axle having a housing containing a driven axle shaft and wherein a wheel mounting spindle is secured to the housing and projects outwardly parallel to said axle shaft: a wheel hub surrounding said spindle, an internal ring gear surrounding said spindle and having an outwardly extending hub abutting said wheel hub, a gear on the shaft meshed with said ring gear, a combined brake drum and tire mounting member having a side flange and an axially inwardly extending periphery providing an internal brake drum surface, a brake mechanism support secured to said housing and extending within said drum, brake shoes mounted on said support adjacent said surface, spaced bearings interposed between the spindle and the wheel hub and between the spindle and the gear hub respectively, and common fastener means comprising axial studs threaded into said gear hub and passing through said wheel hub and flange, and threaded at their outer ends to receive nuts to thereby removably secure together said flange, wheel hub and gear hub.

5. In an outer end assembly of a drive axle having a housing containing a driven axle shaft and wherein a wheel mounting spindle is secured to the housing and projects outwardly parallel to said axle shaft: a wheel hub surrounding said spindle with the axially inner end of said wheel hub having a reduced shoulder, an internal ring gear surrounding said spindle and having an axially outwardly extending hub fitted upon said reduced shoulder of said wheel hub, a gear on the shaft meshed with said ring gear, a combined brake drum and tire mounting member having a side flange and an axially inwardly extending periphery providing an internal brake drum surface, a brake mechanism support secured to said housing and extending within said drum, brake shoes mounted on said support adjacent said surface, spaced bearings interposed between the spindle and the wheel hub and between the spindle and the gear hub respectively and disposed with said reduced shoulder located between said bearings, and common fastener means comprising axially directed fasteners passing through said shoulder for removably securing together said flange, wheel hub and gear hub.

References Cited in the file of this patent

UNITED STATES PATENTS

| 1,291,816 | Fielder | Jan. 21, 1919 |
| 1,937,839 | Parrett | Dec. 5, 1933 |
| 2,134,687 | Dunham | Nov. 1, 1938 |
| 2,256,314 | Dunham | Sept. 16, 1941 |
| 2,299,445 | Weaver | Oct. 20, 1942 |
| 2,361,333 | Towson | Oct. 24, 1944 |
| 2,395,333 | Lee | Feb. 19, 1946 |
| 2,601,553 | Nordenson | June 24, 1952 |
| 2,668,601 | Keese | Feb. 9, 1954 |

FOREIGN PATENTS

| 473,449 | Germany | Mar. 16, 1929 |
| 254,952 | Italy | Sept. 30, 1927 |